(12) United States Patent
Doshi et al.

(10) Patent No.: US 9,736,538 B2
(45) Date of Patent: Aug. 15, 2017

(54) DELIVERY OF CONTENT

(71) Applicant: Comcast Cable Communications, LLC, Philadelphia, PA (US)

(72) Inventors: Nishant Doshi, Norristown, PA (US); Ambud Sharma, West Chester, PA (US); Alexei Saveliev, Newtown Square, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/937,585

(22) Filed: Jul. 9, 2013

(65) Prior Publication Data

US 2015/0020127 A1 Jan. 15, 2015

(51) Int. Cl.
*H04N 21/472* (2011.01)
*H04N 21/436* (2011.01)
*H04N 21/482* (2011.01)
*H04N 21/2543* (2011.01)
*H04N 21/6587* (2011.01)
*H04N 21/24* (2011.01)

(52) U.S. Cl.
CPC ... *H04N 21/47202* (2013.01); *H04N 21/2407* (2013.01); *H04N 21/2543* (2013.01); *H04N 21/43615* (2013.01); *H04N 21/47217* (2013.01); *H04N 21/4821* (2013.01); *H04N 21/4825* (2013.01); *H04N 21/6587* (2013.01)

(58) Field of Classification Search
CPC ....... H04N 21/47202; H04N 21/47211; H04N 21/6587; H04N 21/4532; H04N 21/6405; H04N 21/64322; H04N 21/41407; H04N 21/6125; H04N 21/643; H04N 7/173; H04N 21/4126; H04N 21/25875; H04N 21/43637; H04N 21/472; H04N 21/2358; H04N 21/2387; H04N 21/422; H04N 21/42204; H04N 21/47208; H04N 21/6175; H04N 5/783; H04N 21/64738; H04N 21/6543; H04L 65/4069; H04L 65/4076
USPC ......................... 725/86–89, 93–98, 102–104
See application file for complete search history.

(56) References Cited

U.S. PATENT DOCUMENTS

| | | | |
|---|---|---|---|
| 2008/0109852 A1* | 5/2008 | Kretz ................... | G11B 27/002 725/62 |
| 2009/0222874 A1* | 9/2009 | White et al. .................. | 725/118 |
| 2009/0328115 A1* | 12/2009 | Malik ............... | 725/93 |
| 2012/0291060 A1* | 11/2012 | Relyea et al. ................. | 725/25 |
| 2013/0074127 A1* | 3/2013 | Kotecha et al. ................ | 725/54 |

* cited by examiner

*Primary Examiner* — Pankaj Kumar
*Assistant Examiner* — Alazar Tilahun
(74) *Attorney, Agent, or Firm* — Banner & Witcoff, Ltd.

(57) ABSTRACT

Examples of systems are described herein in which an item of content may be delivered to multiple devices within a group of devices at the same time while reducing bandwidth consumption. Such systems may also allow for attractive pricing and features that may encourage more users to consume the item of content.

14 Claims, 9 Drawing Sheets

DELIVERY OF CONTENT

BACKGROUND

In some content delivery systems, such as video-on-demand systems, devices may be grouped into a plurality of service groups. Each service group may have a shared pool of bandwidth resources for content delivered to the service group. When an item of video-on-demand content is delivered to a device, the item may be provided to all of the devices in the service group of the device. Where multiple devices in the same service group request the same item of content, however, the item may be re-sent for each of the requesting devices in parallel, using a significant amount of network resources. These and other shortcomings are address in this disclosure.

SUMMARY

The following summary is for illustrative purposes only, and is not intended to limit or constrain the detailed description.

Examples of systems are described herein in which an item of content (e.g., on-demand content) may be delivered to multiple devices within a group of devices, e.g., a service group, at the same time without utilizing as much bandwidth as in traditional content delivery systems, such as video on-demand systems. Some aspects of the disclosure allow for attractive pricing and other features that may encourage some users who might not otherwise to take advantage of content, such as on-demand content.

Where an item of content is already being delivered to a device (referred to herein as a primary device), one or more other devices in the same service group (referred to herein as one or more secondary devices) as the primary device may also be able to view, record, etc., at least a portion of the item of content using the same (or otherwise sharing) bandwidth resources used to deliver the item of content to the primary device. In one aspect, where the user of a secondary device is not expected to receive the entirety of an item of content (for instance, if a user of a secondary device is offered the item of content after it has already begun delivery to the primary device), the user(s) of the secondary device(s) may be offered a different (e.g., lower) fee than the user of the primary device for viewing/recording the item of content as a secondary device. Such different fees may also be offered/charged where the secondary device is not entitled to have as many trick-play features available during viewing as a secondary device. In either or both situations, potentially less (or even no) additional bandwidth is used to deliver the item of content to the secondary device(s). Thus, in addition to reducing the amount of bandwidth, aspects of the disclosure may also potentially cause certain users who would not normally request a particular item of on-demand content to do so if the cost is sufficiently attractive.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
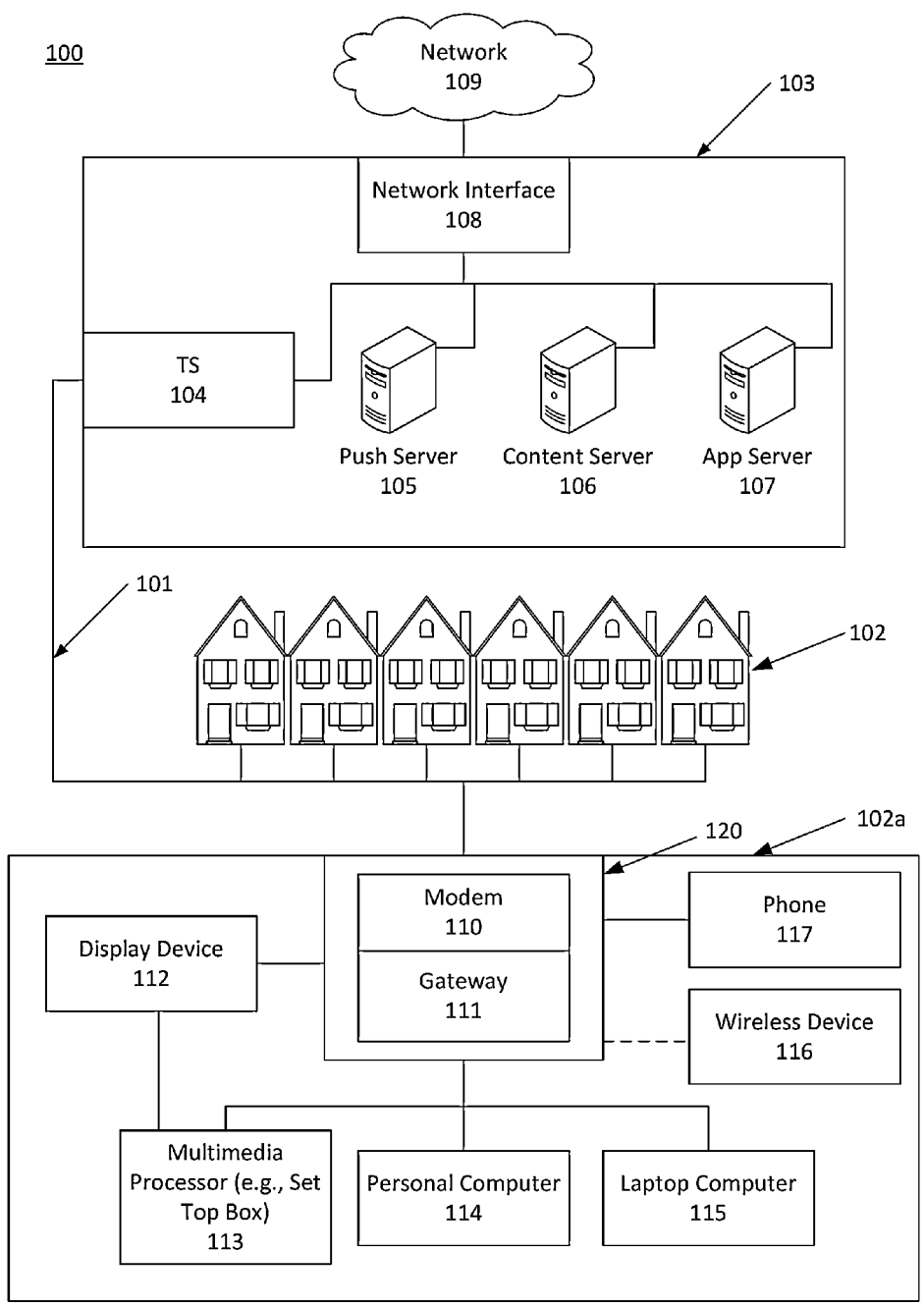
FIG. 1 is a block diagram of an example system in accordance with one or more aspects as described herein.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office (e.g., headend) 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic content guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), phones 117 (e.g. Voice over Internet Protocol—VoIP phones, landline phones, etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
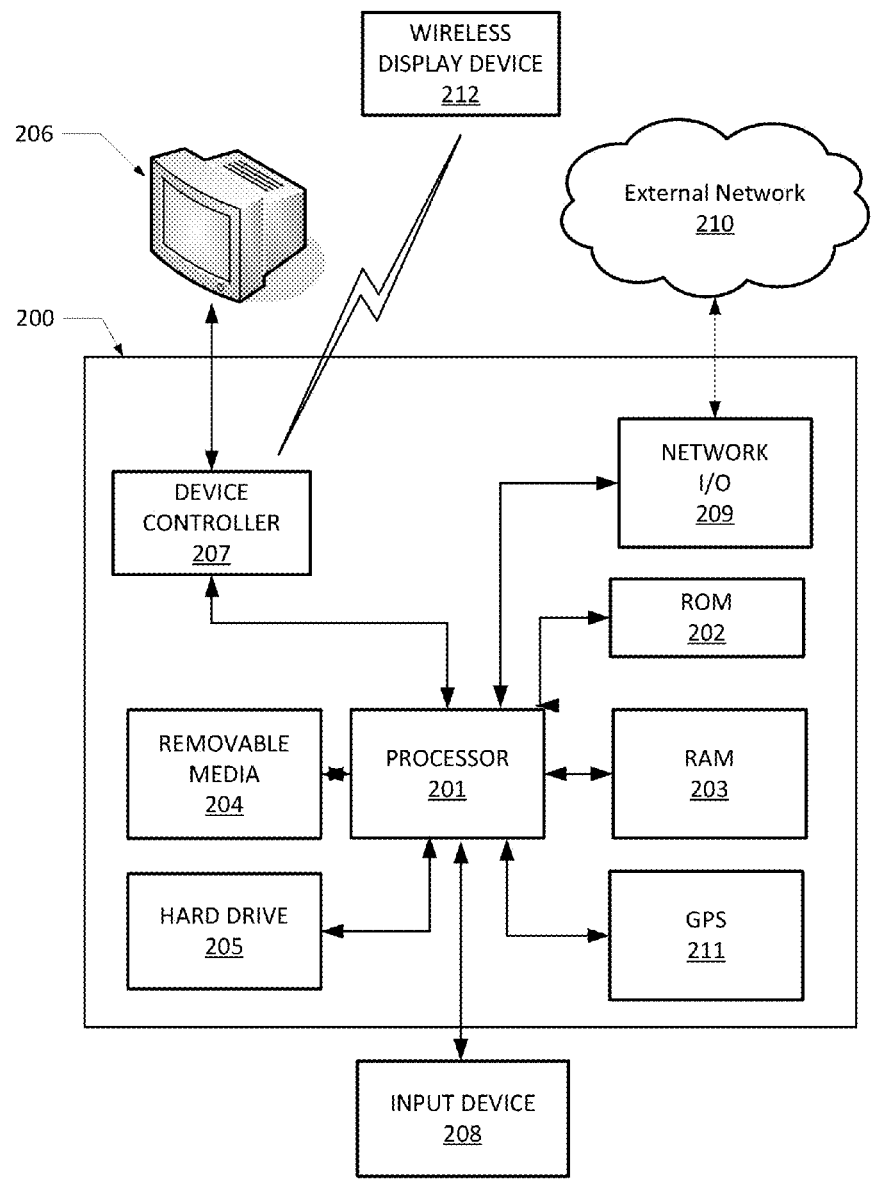
FIG. 2 illustrates an example computing device that can be used to implement any of the aspects as described herein.

FIG. 2 illustrates general software and hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include and/or communicate with one or more output devices, such as a display 206 (e.g., an external television) and/or a wireless display device 212, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the network 109, an in-home network, a provider's wireless, coaxial, fiber, or hybrid fiber/coaxial distribution system (e.g., a DOCSIS network), or any other desired network. Additionally, the computing device 200 may include a location-detecting device, such as but not limited to a global positioning system (GPS) microprocessor 211, which can be configured to receive and process global positioning signals and determine, with possible assistance from an external server and antenna, for example, a geographic position of the device.

Modifications to the computing device of FIG. 2 may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

As mentioned above, any of the devices 110-117 may be used for receiving and/or consuming content such as, but not limited to, audio content, video content (which may or may not also include audio content), image content, other multimedia content data, and/or other data. Any of the devices may be directly or indirectly in data communication with the local office 103, such as via the links 101 and/or through one or more other wired and/or wireless data connections.

A system may be provided in which a plurality of devices, such as user devices, may select and receive content (e.g., audio and/or video content) and/or other data through a network. The devices may include, for example any of the elements 110-117 of FIG. 1, and the network may include, for example, communication links 101, local office 103, network 109, and/or network 210. The content may be provided on a scheduled basis and/or on an on-demand basis. Where the content is provided on an on-demand basis, any of the devices may be provided with a listing (e.g., a content guide) of available content, and the devices may select a particular item of content from the listing. In response, the content may be delivered (e.g., transmitted, streamed, downloaded, etc.) over the network to at least the requesting device.

In traditional video-on-demand systems, the devices may be grouped into a plurality of service groups. Thus, each service group may include a different subset of the devices. The service groups may be organized by, e.g., geographical locations of the devices, topology of the network, and/or other factors. Moreover, each service group may have a shared pool of bandwidth resources for delivering content to the service group. When an item of video-on-demand content is delivered to a device, the item may be typically provided in such a way that the signal containing the content may be sent to some, if not all, of the devices in the service group of the requesting device. Where additional devices in the same service group have requested the same item of content, e.g., using on an on-demand selecting, the item of content may be sent using a different transmission for each of the additional requesting devices. Sending the same item of content to the same service group multiple times in parallel may utilize a significant amount of the shared pool of bandwidth for that service group.

As will be described below, where an item of content is already being delivered to a device (referred to herein as a primary device), one or more other devices in the same service group (referred to herein as one or more secondary devices) as the primary device may also be able to view, record, etc., at least a portion of the item of content using the same (or otherwise sharing) bandwidth resources used to deliver the item of content to the primary device. In one aspect, where the user of a secondary device is not expected to receive the entirety of an item of content (for instance, if a user of a secondary device is offered the item of content after it has already begun delivery to the primary device), the user(s) of the secondary device(s) may be offered a different (e.g., lower) fee than the user of the primary device for viewing/recording the item of content as a secondary device. Such different fees may also be offered/charged where the secondary device is not entitled to have as many trick-play features available during viewing as a secondary device. In either or both situations, potentially less (or even no) additional bandwidth is used to deliver the item of content to the secondary device(s). Thus, in addition to reducing the amount of bandwidth, aspects of the disclosure may also potentially cause certain users who would not normally request a particular item of on-demand content to do so if the cost is sufficiently attractive.

Figure 3:
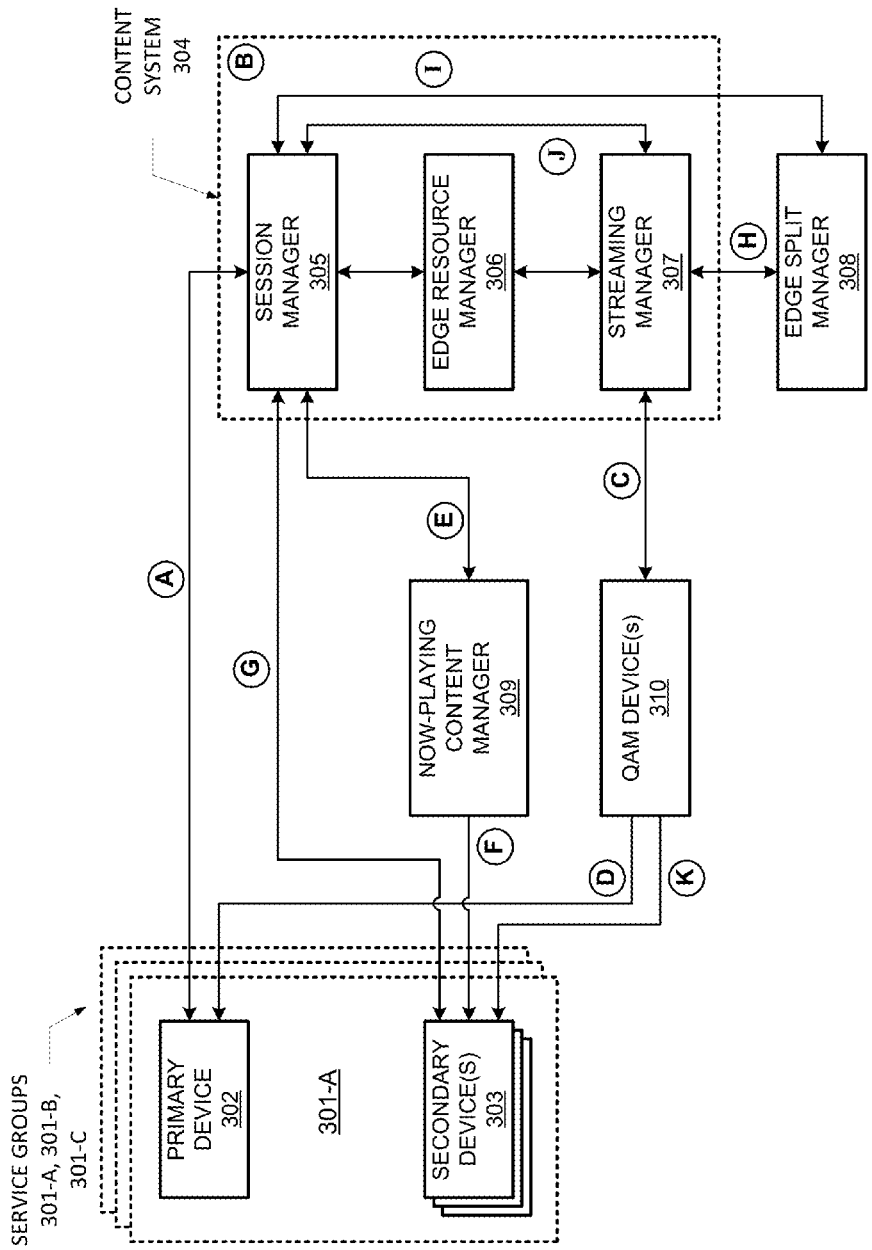
FIG. 3 is a block diagram of an example system in accordance with one or more aspects as described herein.

FIG. 3 is a block diagram of an example system that may be used in accordance with one or more aspects described herein. The system of FIG. 3 may include one or more groups of devices, such as service groups 301 (e.g., 301-A, 301-B, 301-C, etc.). Each service group 301 may include one or more devices that may receive and/or select content for consumption, such as for viewing and/or recording by the device. In the shown example, service group 301-A includes a plurality of devices 302 and 303. The other service groups 301 may be similarly arranged. In the shown example, the devices are illustrated as including a primary device 302 and one or more secondary devices 303. The reason for distinguishing between the primary device 302 and the one or more secondary devices 303 will become apparent in the discussion below. While a particular one of the devices is designated in FIG. 3 as the primary device 302, any of the devices 302, 303 may be considered the primary device at a given time. In other words, a first one of the devices in service group 301-A may be considered the primary device 302 during a first time period (e.g., content transmission session), and another of the devices may be considered the primary device 302 during a different second time frame. The primary device 302, for a given transmission of an item of content, may be the device in a service group 301 that first begins consuming the content (e.g., by streaming, downloading, etc.). A secondary device 303, for the transmission of the item of content, may be a device in that service group 301 that later begins consuming that stream of content. Thus, the particular device considered to be the primary device 302 may change from time to time and may be different for different items of content. In some cases, a device that is considered to be the primary device 302 may only be considered to be the primary device 302 for a given item of content. For example, where the devices are able to receive (e.g., tune to) multiple items of content simultaneously, a first one of the devices may be considered the primary device 302 for a first item of content, and simultaneously, a different second one of the devices may be considered the primary device 302 for a different second item of content.

Each of the devices may be or otherwise include any type of device that is capable of receiving and/or rendering information representing an item of content or portion thereof. The item of content may be provided to the devices in digital and/or analog form, and may be provided such as in the form of a data stream. Non-limiting examples of such devices include modem 110, gateway 111, interface 120, display device 112, multimedia processor (e.g., set top box 113 or other multimedia processing device), personal computer 114, laptop computer 115, landline phone 117, wireless device 116, a tablet computer, a handheld computer, a cellular phone, a digital video recorder, a smart television, a gaming console, personal video glasses or goggles, a server, and/or any other device that may be or otherwise include a computing device such as the computing device 200.

The system of FIG. 3 may further include or otherwise have access to content. For example, the system may include or otherwise have access to a content (e.g., a video-on-demand) system 304, which may provide (e.g., unicast, multicast, stream, transmit, etc.) items of content to the devices 302, 303. The content system 304 may include, for instance, a session manager 305, an edge resource manager 306, and a streaming manager 307. The content system 304 may be in communication with (e.g., coupled with) an edge split manager 308. The system of FIG. 3 may further include a resource for tracking content that is currently being transmitted or is otherwise available, such as a now-playing content manager 309. The system may also include one or more transmitters and/or modulators such as one or more quadrature amplitude modulation (QAM) devices 310. The QAM devices 310 are shown only as one example type of video delivery devices; other devices, such as those supporting end-to-end IP networks, may be implemented. Thus, the system may also be or otherwise include, for example, an end-to-end IP delivery system, another type of content delivery system, or any combination of multiple content delivery systems. Any of the elements 301-310 of FIG. 3 may be or otherwise include one or more computing devices, such as the computing device described above with reference to FIG. 2. Moreover, any of the elements 301-310 may be physically combined and/or further subdivided as desired. For example, the now-playing content manager 309 may be a function that is implemented by a computing device and/or system that is physically the same computing device and/or system that also implements any of elements 305-308. In other examples, the now-playing content manager 309 may be a separate computing device or system dedicated to the now-playing content manager functionality.

The now-playing content manager 309 may track which items of content are currently being provided to one or more primary devices 302. Thus, for instance, the now-playing content manager 309 may store or otherwise have access to, in memory or other data storage medium, data associating each of a plurality of items of content with one or more primary devices 302 that are receiving the items of content. For example, if an item of content is currently being provided to a primary device 302 of service group 301-A and also concurrently being provided to a primary device 302 of service group 301-C, then that item of content may be associated with those primary devices 302 of service groups 301-A and 301-C. The now-playing content manager 309 may also track which secondary devices 303 are also receiving or otherwise having access to those items of content that are being provided to primary devices 302. In some examples, the now-playing content manager 309 may be responsible for tracking this information for multiple service groups 301. In other examples, the now-playing content manager 309 may be responsible for tracking this information for only a single one of the service groups 301. Thus, there may be a different device or service for tracking content currently being transmitted or otherwise being made available, such as the now-playing content manager 309, for each service group 301. In still further examples, there may be multiple now-playing content managers 309, each of which may serve one or more service groups 301.

An example of information that the now-playing content manager 309 may track is shown below in Table 1. In Table 1, arbitrary enumerated designations are used to refer to devices and items. The information may be updated over time as items of content (e.g., content streams) begin and end, as well as when devices begin and end receiving items of content. The information as presented in Table 1 is associated by rows. In other words, each row in Table 1 contains information that is associated together. The information tracked by the now-playing content manager 309 can be in any format and need not be organized as a table, however. The information is shown herein in tabular form merely for explanatory purposes.

TABLE 1

| SERVICE GROUP | PRIMARY DEVICE | ITEM OF CONTENT | SECONDARY DEVICES |
| --- | --- | --- | --- |
| A | device 4 | item 3 | devices 1, 2, and 7 |
| A | device 9 | item 12 | none |
| B | device 2 | item 6 | device 3 |
| C | device 14 | item 8 | devices 5 and 11 |

The now-playing content manager 309 may further provide (e.g., publish) information to the various devices 302, 303 indicating which items of content are currently being provided to a primary device 302. The published information may be included in, for example, an electronic content guide, direct or group message, and/or other user interface that allows a user of a device to select one of the items of content. The information may be separate from or integrated with information about other items of content that are now currently playing. Thus, using the example of Table 1, the devices of service group A may be provided with an indication that items 3 and 12 are on what will be referred to herein as a now-playing list. An example of how such information may be presented to the devices 302, 303 as a user interface is shown in FIG. 4A.

Figure 4A:
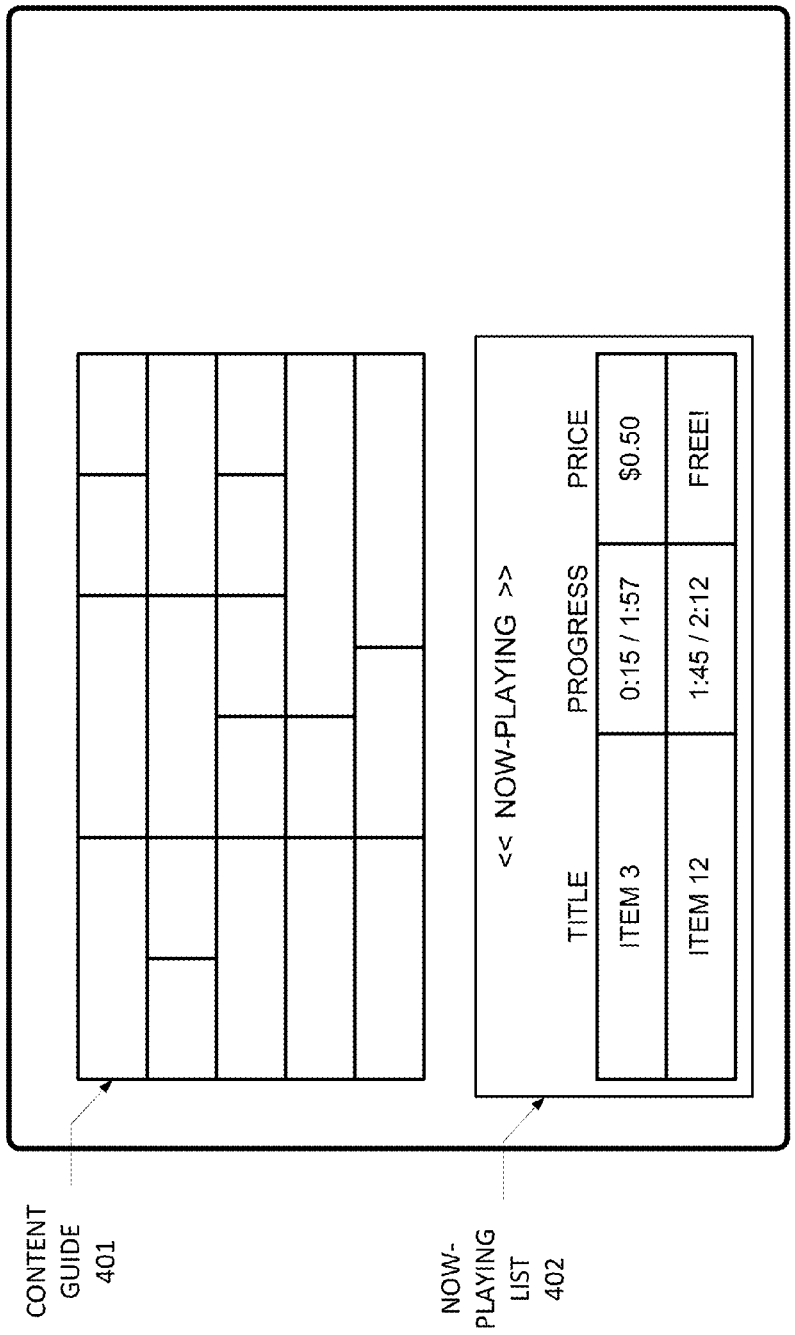
FIGS. 4A and 4B show example user interfaces that may be presented in accordance with one or more aspects as described herein.

The user interface of FIG. 4A may be displayed, for example, by a display that is part of and/or coupled to the receiving device. In this example, the user interface may include a content guide 401 and a now-playing list 402. The content guide 401 is shown in this example as a grid-format guide (channels versus time), however the content guide 401 may be presented in any format desired. The content guide 401 may indicate, for example, past, present, and/or future items of content that have been, are, and/or will be scheduled for presentation, and/or items of content that may be provided as on-demand items (e.g., VOD items of content) that may be presented in response to a user request. The now-playing list 402 may indicate which items of content are currently already being presented to at least one device in the service group. Referring to the example of Table 1, if the user interface of FIG. 4A is presented to devices of service group A, then the now-playing list 402 may include items 3 and 12. The items indicated in the now-playing list 402 may be user-selectable, in which selection of one of the listed items may allow the user to receive presentation of the selected item at the user's device 302, 303.

In the example shown in FIG. 4A, the now-playing list 402 may include information for each listed item of content, such as the title of the item of content, the progress of the current playback of the item of content. The progress indicates how far into the item of content that the primary user is currently watching and/or that is currently being streamed to the primary user. Thus, if a secondary user were to select one of the listed items of content for watching, then the secondary user would begin watching the item of content beginning at the indicated playback position, and/or at a playback position close to the indicated playback position (e.g., at a playback position that depends upon the indicated playback position). For example, the now-playing list 402 shows that Item 3 is currently at a playback position of fifteen minutes into the content, with a total time for the content being one hour and fifty-seven minutes. In other examples, the progress may additionally or alternatively be indicated as the playback time remaining. For example, for Item 3, the playback time remaining would presently be one hour and forty-two minutes. In further examples, the progress may additionally or alternatively be indicated as a percentage, a fraction, and/or in any other manner as desired.

The now-playing list 402 may further include information indicating a price at which a secondary user may join each now-playing item of content. The price for each item of content may be determined depending upon the current playback progress of the item of content, and may in any event be discounted as compared with (less than) the price that would be charged to receive the entire item of content as a primary user. The indicated price may decrease as playback position of the primary user progresses. For example, Item 3 is offered for the current playback position of fifteen minutes at a price of fifty cents. When the playback position is at a later point, say, one hour, then the price may decrease, such as to twenty-five cents. At a still later playback position of the primary user, the price may decrease again, perhaps even be decreased so as to be offered for free. One or more different prices may be associated with one or more different thresholds of playback remaining. For example, below a certain predetermined threshold amount of playback remaining and/or percentage of playback remaining, the price may drop from a first price to a second price, where the second price is lower than the first price. The first price and the second price (and any other prices offered in the now-playing list) may be lower than the price that would be offered for a user to have access to the entire item of content as a primary user. Moreover, the indicated playback progress and/or price may be dynamically updated over time as primary user playback changes.

It is noted that playback progress may not always necessarily move forward over time, or at a predictable rate. For example, if the primary user performs a trick play function (e.g., fast forward, rewind, pause, skip backward, or skip forward), then the playback position as indicated in the now-playing list, as well as the corresponding offer price, may be dynamically updated. Moreover, if the primary user stops playback entirely (e.g., terminates the primary session), then the item of content may be removed entirely from the now-playing list. If the primary user is later able to re-commence playback of the item of content, then the item of content may return to the now-playing list with the current playback position and corresponding offer price indicated.

Figure 4B:
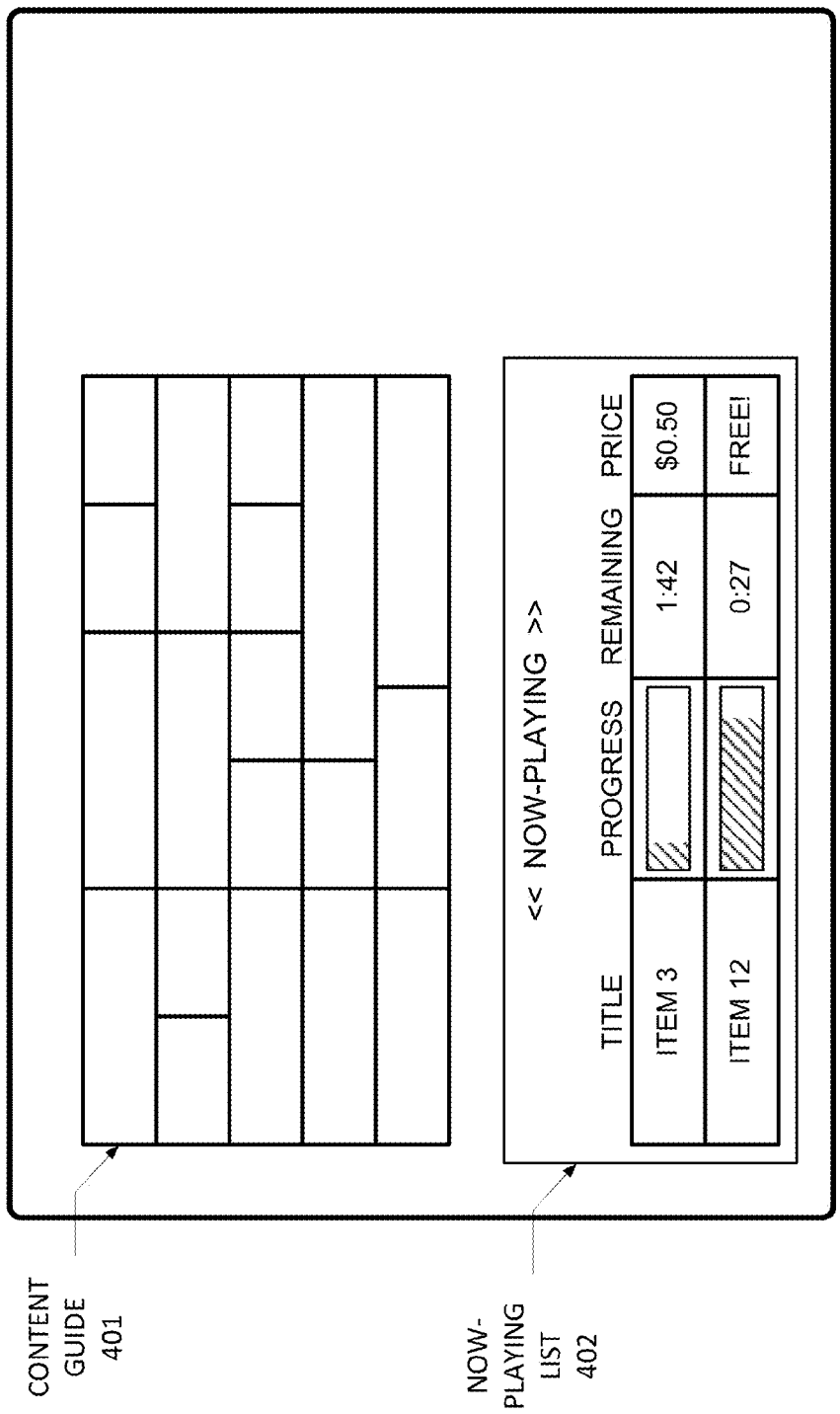

The playback progress is indicated in FIG. 4A in a textual manner. However, the playback progress and/or other information may be indicated in another manner, such as graphically. An example of this is shown in FIG. 4B, in which the playback progress is shown using a progress bar, in which the shaded portion indicates the portion that has already been played back to the primary position. In other words, the edge of the shaded portion indicates the current playback position. The example of FIG. 4B also indicates the current playback time remaining. As in FIG. 4A, the information in FIG. 4B may be updated dynamically over time as playback progress and/or offer price changes.

In other examples, rather than, or in addition to, a separate now-playing list, the content guide 401 may itself include an indication of those items that are currently already being presented to at least one device in the service group. Thus, using the same example of Table 1, a device in service group A may see that items 3 and 12 are indicated as being such items, such as in the form of a shaded background. However, the indication may be made in any manner, such as by presenting those items in a different font color, font style, and/or font size, displaying a different background behind such items, using a different border around such items, presenting animation (e.g., flashing), using a graphical indication, using sound, using tactile feedback (e.g., using a tactile-feedback-enabled touch-sensitive display and/or a tactile-feedback-enabled controller), displaying a cursor differently when such items are highlighted, displaying such items to always be at the top or bottom of the content guide, separating those items from the other items in the content guide in some manner, etc.

Figure 5:
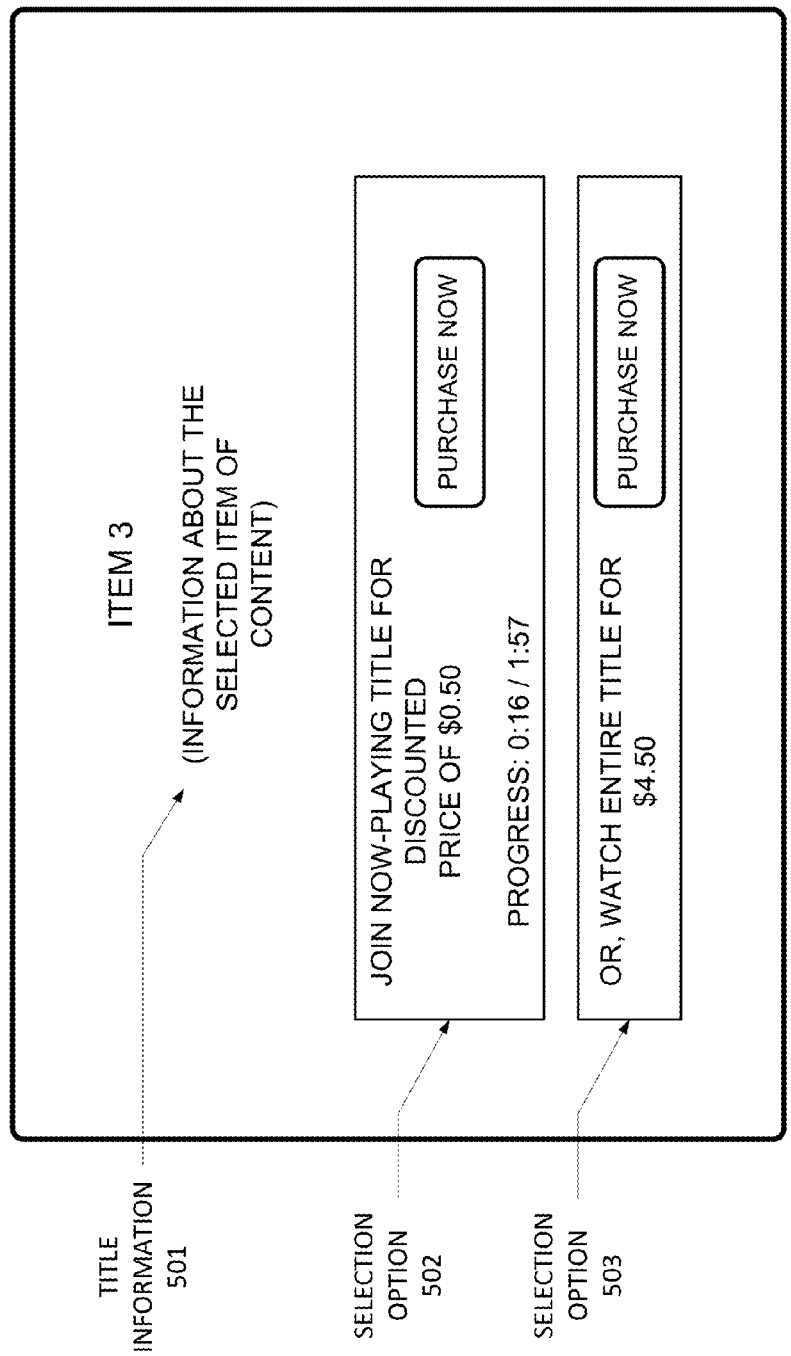
FIG. 5 shows an example user interface that may be presented in accordance with one or more aspects as described herein.

FIG. 4B shows another example user interface that may be presented to the user, such as by a display that is part of and/or coupled to the receiving device. In this shown example, If the user selects one of the items of content listed in the content guide and/or in the now-playing list 402, the user may be presented with another screen, another window, and/or further information providing additional details about the selected item of content. For example, responsive to the user selecting Item 3 from the now-playing list 402, then the user may be presented with a user interface screen such as shown in the example of FIG. 5. In the shown example, the user interface screen may indicate information such as the title of Item 3 and/or other information about the selected title, such as a plot summary, list of actors, and/or other bibliographical information about the selected title. The user interface may also explicitly indicate, such as in a portion of the user interface referred to herein as selection option 502, that the user may join the now-playing title for a particular offered price and/or the current playback progress of the selected title. It is noted that in FIG. 5, the playback progress has updated by way of example from fifteen minutes to sixteen minutes to reflect the change in playback progress that may have occurred since the user selected the title from the user interface of FIG. 4A or 4B. If the user wishes to join the now-playing item of content, then the user may select a purchase-now button of the selection option 502.

The user interface of FIG. 5 may also include another selection option 503, in which the user may also be offered to watch the entire selected item as a primary user. The offer price may be higher than the offer price for joining the now-playing version of the selected item. If the user chooses this option, then the user may select a purchase-now button of the selection option 503. Thus, if the user elects to join the now-playing version of the item, then the user may be added as a secondary user to the existing streamed item. If the user elects to watch the entire item, then the item may be provided to the user as a new stream (e.g., where the user may be considered a primary user for the new stream).

The streaming manager 307 may include one or more streaming servers, and may be responsible for storing, generating and/or forwarding items of content (e.g., by streaming the items of content as one or more data streams) to the QAM device(s) 310. Each item of content may, for example, be represented in a different stream. The QAM device(s) 310 may modulate the data received from the streaming manager 307, and may forward the resulting modulated signals to the devices 302, 303. In some examples, each stream may be modulated to a different QAM frequency band. Thus, for example, where the streaming manager 307 is sending out five simultaneous data streams, each of the five data streams may be assigned by the QAM device(s) 310 to one of five different QAM frequency bands. In still further examples, the QAM frequency bands may be separate from each other or may at least partially overlap, and may be fixed frequency bands or dynamically changing frequency bands. In still further examples, two or more different data streams may be modulated into the same QAM frequency band. While the devices 302, 303 of a given service group may be exposed to all modulated signals provided by the QAM device(s) 302 for that service group, each device 302, 303 may tune to or otherwise selectively process desired streams by tuning to certain ones of the QAM frequency bands and/or selecting/discarding data packets based on header information that may identify which data packet belongs to which stream.

The session manager 305 may be responsible for receiving, processing, setting-up, and/or tearing-down video-on-demand sessions based on requests from one or more of the devices 302, 303.

The edge resource manager 306 may be responsible for allocation, de-allocation, and/or other management of QAM frequency bands. For instance, the edge resource manager 306 may determine which streams are to be provided on which QAM frequency bands and/or what the bandwidth of each QAM frequency band should be. The edge resource manager 306 may directly or indirectly communicate with and/or command the QAM device(s) 310 for these purposes.

The edge resource manager 308 may be responsible for causing the content system 304 to share sessions with multiple devices. For example, a primary session with the primary device 302 may become a shared session with the primary device 302 and simultaneously with one or more secondary devices 303. As will be described in further detail below, a session may have any of the following states. A primary session may be set up as a new session between a requesting device 302 and the content system 304. The primary session may provide full trick-play functionality (e.g., pause, rewind, fast-forward, skip) and may function, for example, as a traditional video-on-demand session. A primary session may be transformed into a shared session, in which the original (primary) device 302 in the primary session, as well as one or more other devices 303, simultaneously share the session. In a shared session, one or more trick-play functions may or may not be disabled. For example, the original (primary) device 302 may retain some or all trick-play functionality in the shared session, and the other (secondary) devices 303 may have fewer or no trick play functions available during the shared session. If the primary device 302 performs a particular trick-play function during the shared session, the shared session may split into two separate sessions: a primary session for the primary device 302 and a shared session shared by the secondary devices 303. If, on the other hand, the primary device 302 stops the shared session without ever performing a trick-play function, then the primary device 302 may be dropped from the shared session, which may continue for the remaining secondary devices 303. If the shared session ends on its own (e.g., by the item of content ending naturally), then the shared session may end, and the edge resource manager 308 may cause any bandwidth that was allocated to the shared session to become available in the QAM resource pool for a future session or for another existing session.

Figure 6:
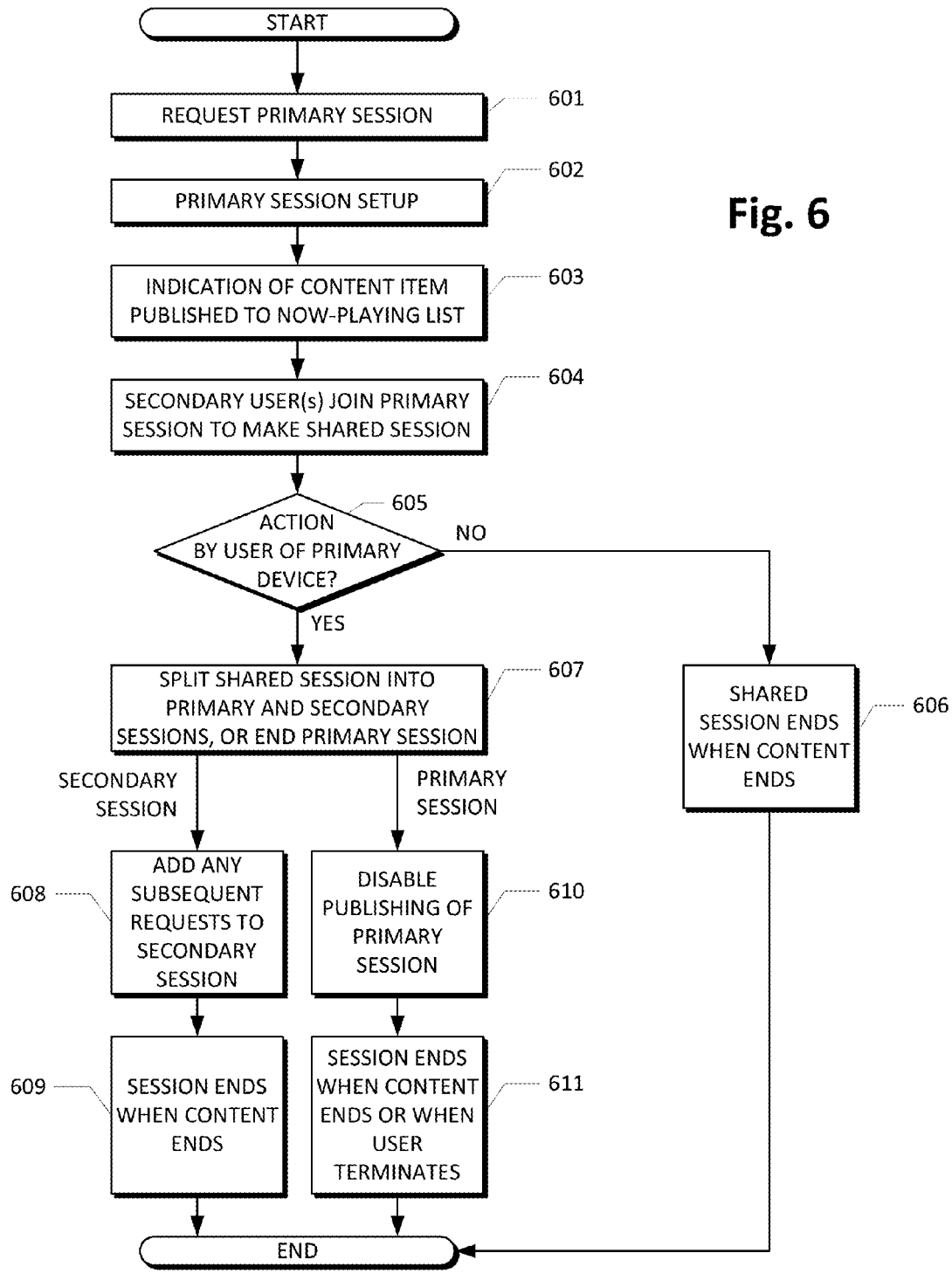
FIG. 6 is an example flow chart of a method that may be performed in accordance with one or more aspects as described herein.

FIG. 6 is a flow chart of an example method that may be performed in accordance with one or more aspects as described herein, and may be performed by one or more elements of, for example, the system of FIGS. 1-3. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps. In the following discussion of FIG. 6, it will be assumed that the devices involved in the process are in the same service group 301, such as service group 301-A. However, the process may be performed using any arbitrary group of devices, as desired.

At step 601 (also indicated as "A" in FIG. 3), one of the devices of the service group 301-A may request a primary session by, for example, requesting that a selected item of content be provided to that device. Assuming that the selected item of content is not currently being provided to any of the devices in the service group, the requesting device may be considered the primary device 302 for that item of content. In other examples, the requesting device may be considered the primary device 302 for that item of content even though that item of content is already being provided to one or more others of the devices in the service group. In such examples, this may occur where the primary device 302 requests (e.g., a request initiated by a user of the device 302) a new session (e.g., a new data stream) for the requested item of content, rather than requesting to be part of a pre-existing session already in progress for the item of content. To select the item of content, the user of the primary device 302 may, for example, select the item of content from the content guide 401 that may be displayed to the user by the primary device 302. The user selection may result in the primary device 302 sending a request upstream, which may be provided to the content system 304, such as to the session manager 305.

Figure 7:
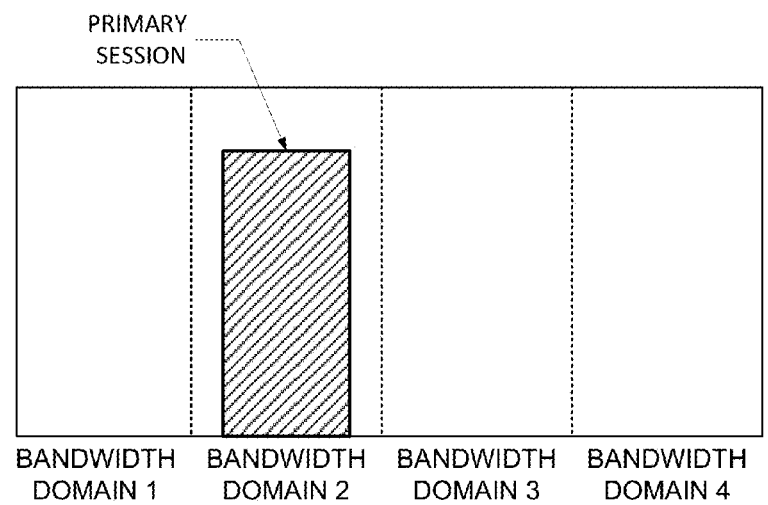
FIGS. 7-9 show example content delivery resource allocation in accordance with one or more aspects as described herein.

In response to the request, at step 602, the video content delivery system, e.g., the content system 304 and/or the session manager 305, may initiate or otherwise set up a primary transmission session for the selected item of content to be provided to the primary device 302 (session set-up being generally indicated as "B" in FIG. 3). The session manager 305 may also communicate with the edge resource manager 306 and/or the streaming manager 307 to select resources (e.g., a particular QAM channel, particular Internet Protocol (IP) stream, etc.) and have the streaming manager 307 begin delivery (e.g., streaming) of the selected item of content. The streaming is generally indicated by "C" in FIG. 3. The QAM device(s) 310, for example, may deliver the selected item of content to the primary device 302 using, e.g., the selected QAM channel, as generally indicated by "D" in FIG. 3. The session manager 305 may further communicate with the primary device 302 to inform the primary device 302 of the selected QAM channel so that the primary device 302 may tune to the that QAM channel. For example, as graphically shown in FIG. 7, the primary session may be allocated the bandwidth generically designated herein as Bandwidth Domain 2, which may be, for example, a particular QAM channel. During the primary session, the primary device 302 may be able to utilize any trick-play functionality as allowed by the content system 304, such as rewind, fast-forward, pause, skip backward and forward, and/or view alternate and/or supplemental content (e.g., choose alternate endings and/or story plots, view on-demand user-selected advertising related to the item of content, etc.). While the above and other description herein refers to QAM delivery of content, the system may deliver the content to the primary and/or secondary devices using any other techniques, such as IP streaming and/or downloading to the primary and/or secondary devices 302/303 without the use of the QAM devices 310.

At step 603 (indicated by "E" in FIG. 3), the session manager 305 may communicate with the now-playing content manager 309 to indicate the selected item of content, identify the primary session for the selected item of content, and/or identify the primary device 302 that is part of the primary session. In response, the now-playing content manager 309 may publish or otherwise make available the newly-identified item of content to the now-playing list (as indicated by "F" in FIG. 3). Thus, when users of the devices 302, 303 in the same service group 301-A utilize a user interface such as the user interface of FIG. 4A, the item of content may be included in the displayed now-playing list 402 and/or otherwise indicated as a now-playing item in the content guide 401.

Figure 8:
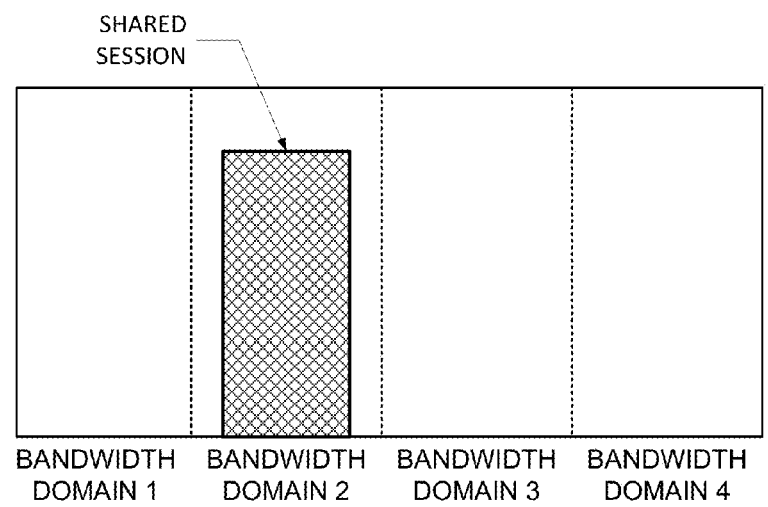

At step 604, any interested secondary devices 303 may select the item of content from the now-playing list, and in response, those secondary devices 303 may join the primary session (as indicated by "G" in FIG. 3). Thus, the primary session may now be considered a shared session, and the secondary devices 303 may now also tune to the QAM channel or IP stream on which the item of content is being delivered, in order to receive the content on the shared session. Even though one or more of the secondary devices 303 may now be sharing the same session as the primary device 302, it may be that no additional bandwidth is needed to provide the content in the shared session as compared with the bandwidth that was used to provide the content in the primary session. Moreover, the same portion of bandwidth (e.g., the same QAM channel) may be used for the original primary session and the shared session. Using the example of FIG. 7, if the primary session was being provided Bandwidth Domain 2, then the shared session may, for instance, continue to be provided on Bandwidth Domain 2 (as shown in FIG. 8). In other examples, the shared session may use a different portion of bandwidth (e.g., a different QAM channel), in which case the primary device 302 may re-tune to the different bandwidth domain to continue receiving the streamed item of content. In either case, it may be expected that sharing the session with the secondary devices 302 may not incur additional bandwidth resources as compared with providing the item of content only to the primary device 302 during the primary session. For instance, the primary session and the shared session may both be allocated the same amount of bandwidth to deliver the item of content, if desired. However, it is possible that the bandwidth of the shared session may be greater than or less than the bandwidth utilized by the primary session, if desired.

At step 605, if no trick-play function or manual termination is ever requested by the user of the primary device 302 during the shared session (e.g., if the item of content is allowed to naturally play to the end without intervention by the user of the primary device), then at step 606, the shared session may automatically end, such as upon the natural termination of the item of content. On the other hand, if at some point during the shared session the primary device 302 implements a trick-play function or terminates the session early (such as by the user pressing a stop button), then the process may move to step 607. At step 607, the trick play command may be sent upstream and detected by, e.g., the streaming manager 307, which in response may send a message to the edge split manager 308 (indicated as "H" in FIG. 3). In response to the message, the edge split manager 308 may communicate with the session manager 305 to split the shared session into two transmission sessions—one session for the primary device 302 and the other session for the secondary devices 303. In other examples, two new sessions may be initiated and the shared session may be terminated. In either case, the session configuration may change from a shared session involving the primary device and one or more secondary devices to two sessions, in which one of the sessions involves the primary device (and no secondary devices) and the other of the sessions involves one or more of the secondary devices (and not the primary device).

Figure 9:
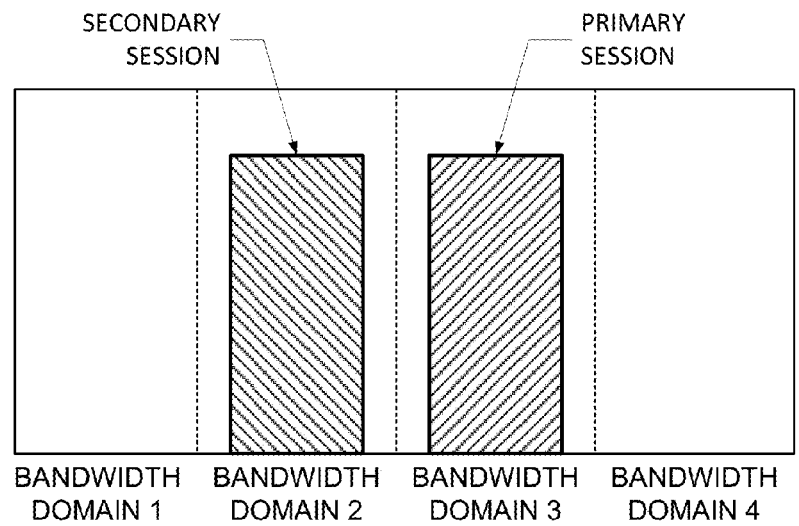

An example of the result of such splitting or other changing of session configuration is illustrated in FIG. 9, in which the shared session is replaced with or split into a secondary session and a primary session. In this example, the secondary session may remain in Bandwidth Domain 2 (which was utilized by the shared session), and the primary session may reside in another bandwidth domain such as Bandwidth Domain 3. Each session may have its own data stream. Moreover, as shown by way of example in FIG. 9, the two sessions may occupy two different portions of bandwidth (e.g., two different QAM channels) and/or otherwise use different content delivery resources. The two bandwidth domains and/or other delivery resources may or may not overlap with each other. As an example, assume that the shared session is delivered over (e.g., modulated within) Bandwidth Domain 2. Upon the splitting or other session reconfiguration that is performed at step 607, the shared session may be converted to, split into, and/or replaced by, a primary session with the primary device 302 and a secondary session with one or more of the secondary devices 303 (e.g., the one or more secondary devices 303 that were involved in the shared session). Either of the primary or secondary sessions may continue to deliver a first stream over the same Bandwidth Domain 2, and the other of the primary or secondary sessions may deliver a second stream over another available bandwidth domain, for example Bandwidth Domain 3. In other examples, both the first and second sessions may deliver streams over new bandwidth domains other than the original bandwidth domain (e.g., Bandwidth Domain 2) that the shared session had used just prior to the splitting or other session reconfiguration.

The remainder of the process of FIG. 6 shows the primary and secondary sessions operating in parallel. The secondary session may proceed as per steps 608 and 609. At step 608, one or more of the secondary devices 303 that are not already part of the secondary session may join the secondary session if desired. The item of content being delivered through the secondary session may continue to be listed in the now playing list (e.g., the now-playing list 402), and so one or more of the secondary devices 303 may choose to join the secondary session already in progress by, e.g., selecting the item of content as listed in the now-playing list. In this secondary session, it may be that none of the secondary devices 303 have access to any trick-play functionality, or that the secondary devices 303 may have limited access to trick-play functionality. For example, it may be that none of the secondary devices 303 in the secondary session may execute a rewind, fast-forward, pause, or skip function on the item of content. In further examples, it is possible that one or more of these trick-play functions may be implemented locally by one or more of the secondary devices 303. For example, where a secondary device includes local content storage such as in the form of a DVR or a content buffering device, the secondary device may be able to pause, rewind, or reverse-skip content that was already delivered to that secondary device. However, it may be that no fast-forward or skip-forward trick play function is available except to the extent that already-delivered (and locally stored) content may be fast-forwarded or skipped. Moreover, one or more of the secondary devices 303 may leave the secondary session such as by pressing a stop button. The item of content may continue to be delivered to the secondary devices until the item of content naturally ends (step 609). In further examples, the item of content may stop being delivered (and the secondary session may end) before the natural termination of the item of content upon all of the secondary devices 303 in the secondary session leaving the secondary session.

While the secondary session is in progress, the primary session may also proceed as per steps 610 and 611. At step 610, the item of content associated with the primary session may no longer be published to the now-playing list. Thus, if a device selects the item of content from the now-playing list, that device would join the secondary session rather than the primary session. In such a case, the primary session may be dedicated to delivering the item of content only to the primary device 302. At step 611, the primary session may continue until the natural termination of the item of content or upon the primary device 302 leaving the primary session (such as by the user of the primary device 302 pressing a stop button). As opposed to the secondary session, the primary session may retain all of the trick play functionality that would normally be available during the primary session that existed during step 602. However, if desired, limited or no trick-play functionality may be available in the primary session. In general, though, it may be expected that the primary session in steps 610-611 may have more trick-play functionality available than the secondary session in steps 608-609. Moreover, the primary and secondary sessions may end independently of each other.

In some cases, it may be desirable to transform a secondary session into a primary session. For example, if the secondary session is initiated at step 607 and subsequently all but one of the secondary devices drops from the secondary session, it may be desirable to provide the remaining secondary device with an opportunity to transform the secondary session into a primary session. In such a case, responsive to detecting that only one secondary device remains on the secondary session, the user of the secondary device may be prompted with a message asking whether the user desires to switch to a primary session. If the user agrees to this, then the user's device may now be considered a primary device, and the process for this user and the now-primary device may move to, e.g., step 603. Moreover, the user may also be granted some or all of the abilities otherwise provided to primary device users, such as access to one or more trick-play functions that were not accessible during the secondary session. The user may also be charged a fee for transforming to the primary session. In other examples, the secondary session may be automatically transformed into a primary session upon detecting that only a single user device remains on the secondary session. In still other examples, any of the secondary device users may be able to split off from the secondary session at any time during the secondary session, potentially for a fee. For example, the user of one of the secondary devices may select a particular function (such as by selecting a particular menu item and/or pressing a particular remote control button), and in response the secondary device for that user may be split off from the secondary session to initiate a primary session for that user's device. Moreover, the process for the user's newly-initiated primary session may move to, e.g., step 603.

There may also be cases in which it is desirable to split a secondary session into one or more other secondary sessions. For example, one or more of the secondary devices that are part of the secondary session generated at step 607 may be removed from that secondary session and be placed in another existing secondary session or in a newly-initiated secondary session.

While various examples have been described herein with regard to specific examples of content, aspects as described herein may also be used for other types of content, such as multi-user interactive video games. For instance, a video game may utilize one or more sessions for one or more users. New users of (e.g., players in) the video game may be added to existing sessions such as in the manner described above. Moreover, existing users (e.g., players) may be removed from existing sessions and/or split into other (e.g., new) sessions such as in the manner described above.

By way of example, each session may be associated with a particular aspect, functionality, level, and/or other feature of the video game. If a new player is to be added to the video game, such as to a particular level of the video game, the new player may be added to one of the existing sessions that is already associated with the particular level. If the player later advances to the next level, the player may be moved to another existing session associated with the next level and/or a new session may be created for the player at the next level. The sessions in a video game may be primary sessions, shared sessions, or secondary sessions, much in the same way as already described herein. Moreover, secondary sessions and/or shared sessions may provide users/players with less functionality (e.g., less game play features, player movement capabilities, interactivity, customization of graphics, colors, views, and sounds, etc.) than the primary sessions.

Similar to described above, a video game session may begin, for instance, as a primary session when only one user/player is playing the video game, or when only one user/player within a specific group of user devices (e.g., within a specific service group) are playing the video game. The primary session may be published to the now-playing list, so that other potential players (e.g., within the same service group) may see that the video game is already being played. A user may be added to the video game for a fee that may be lower than or higher than the fee that may be paid by the original primary session user. If a user selects the now-playing video game, then the primary session may be transformed into a shared session (such as in the manner discussed above with regard to step 604), which would then include the original player and the newly-added player (and other newly-added players, if any). Later during video game play, if one of the users activates a particular predetermined feature of the video game (e.g., advances to another level, enters a different virtual play landscape/region, changes certain customized features, etc.), then the shared session may be split into a primary session and a secondary session, such as in the manner described above with regard to step 607.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method, comprising:
   receiving a first request for an item of content;
   sending, responsive to the first request, via a network, at least a first portion of the item of content in a first transmission session with at least a first device;
   receiving a second request for the item of content from a second device during the first transmission session;
   adding, responsive to the second request, the second device to the first transmission session;
   sending a second portion of the item of content in the first transmission session to the second device while sending the second portion of the item of content in the first transmission session to the first device;
   receiving, from the first device during the first transmission session, a trick-play command that affects a playback position within the item of content for the first device;
   removing, responsive to the trick-play command, the first device from the first transmission session and initiating a second transmission session, different from the first transmission session, with the first device; and
   sending, via the network, at least a third portion of the item of content in the second transmission session while continuing to send, via the network, the at least the second portion of the item of content in the first transmission session.

2. The method of claim 1, wherein the sending the at least the first portion of the item of content in the first transmission session comprises sending the at least the first portion of the item of content in the first transmission session in a first frequency band, and the sending the at least the third portion of the item of content in the second transmission session comprises sending the at least the third portion of the item of content in the second transmission session in a second frequency band different from the first frequency band.

3. The method of claim 2, wherein the continuing to send the at least the second portion of the item of content in the first transmission session comprises continuing to send the at least the second portion of the item of content in the first transmission session in the first frequency band.

4. The method of claim 1, wherein the sending the at least the first portion of the item of content in the first transmission session comprises sending the at least the first portion of the item of content in a first Internet Protocol (IP) stream, and the sending the at least the third portion of the item of content in the second transmission session comprises sending the at least the third portion of the item of content in a second IP stream different from the first IP stream.

5. The method of claim 1, wherein the second device is part of a group of devices, the method further comprising:
   generating for display a listing of a plurality of items of content comprising the item of content, wherein the listing indicates which one or more of the plurality of items of content is being delivered to the group of devices.

6. The method of claim 1, wherein the trick-play command is a trick-play command selected from the following: a rewind command, and a fast-forward command.

7. The method of claim 1, wherein the trick-play command is a trick-play command selected from the following: a skip backward command, a skip forward command, and a pause command.

8. A method, comprising:
   receiving a first request for an item of content;
   responsive to the first request:
      sending, via a network, at least a first portion of the item of content in a first transmission session to at least a first device; and
      publishing the item of content to a now-playing list;
   receiving a second request for the item of content as published to the now-playing list;
   responsive to the second request, adding a second device to the first transmission session;
   sending a second portion of the item of content in the first transmission session to the second device while sending the second portion of the item of content in the first transmission session to the first device;
   receiving, from the first device during the first transmission session, a trick-play command selected from one of the following trick-play commands: a rewind command, a fast forward command, a skip backward command, a skip forward command, and a pause command; and
   responsive to the trick-play command:
      removing the first device from the first transmission session; and
      initiating a second transmission session with the first device.

9. The method of claim 8, further comprising: continuing to send, via the network, the at least the second portion of the item of content in the first transmission session while at least some of the item of content is being sent in the second transmission session.

10. The method of claim 8, further comprising removing, responsive to the trick-play command, the item of content from the now-playing list.

11. The method of claim 8, wherein the first transmission session uses a first Internet Protocol (IP) stream, and wherein the second transmission session uses a second IP stream different from the first IP stream.

12. The method of claim 8, further comprising sending the now-playing list to the second device.

13. The method of claim 8, wherein the trick-play command is a trick-play command selected from the following: a rewind command, and a fast-forward command.

14. The method of claim 8, wherein the trick-play command is a trick-play command selected from the following: a skip backward command, a skip forward command, and a pause command.

* * * * *

UNITED STATES PATENT AND TRADEMARK OFFICE
CERTIFICATE OF CORRECTION

Page 1 of 1

PATENT NO. : 9,736,538 B2
APPLICATION NO. : 13/937585
DATED : August 15, 2017
INVENTOR(S) : Doshi et al.

It is certified that error appears in the above-identified patent and that said Letters Patent is hereby corrected as shown below:

Sheet 1 of 9, FIG. 1, Reference Numeral 113, Line 2-3:
Please delete "Set Top Box)" and insert --Set-Top Box)--

Column 7, Detailed Description, Line 20:
Delete "set top" and insert --set-top--

Column 11, Detailed Description, Line 32:
Delete "302" and insert --310--

Column 11, Detailed Description, Line 50:
Delete "308" and insert --306--

Column 12, Detailed Description, Line 14:
Delete "308" and insert --306--

Column 13, Detailed Description, Line 65:
Delete "302" and insert --303--

Signed and Sealed this
Second Day of October, 2018

Andrei Iancu
*Director of the United States Patent and Trademark Office*